April 10, 1973      F. M. EDWARDS      3,726,795

FILTERING UNIT FOR MEDICAL LIQUIDS

Filed Dec. 31, 1970      5 Sheets-Sheet 1

INVENTOR
FRANK M. EDWARDS
BY Larry N. Barger
ATTORNEY

INVENTOR
FRANK M. EDWARDS
BY Larry N. Barger
ATTORNEY

April 10, 1973   F. M. EDWARDS   3,726,795
FILTERING UNIT FOR MEDICAL LIQUIDS
Filed Dec. 31, 1970   5 Sheets-Sheet 3

INVENTOR
FRANK M. EDWARDS
BY Larry N. Barger
ATTORNEY

INVENTOR
FRANK M. EDWARDS
BY
ATTORNEY

3,726,795
FILTERING UNIT FOR MEDICAL LIQUIDS
Frank M. Edwards, West Los Angeles, Calif., assignor to McGaw Division of American Hospital Supply Corporation, Glendale, Calif.
Filed Dec. 31, 1970, Ser. No. 103,200
Int. Cl. B01d 29/00, 29/04
U.S. Cl. 210—233                                                36 Claims

ABSTRACT OF THE DISCLOSURE

A filtering unit for collecting bacteria from blood or other medical liquid onto filter discs which can then be cultured to identify the bacteria. The unit has a rigid reservoir with a top rigidly holding plural filter disc housings in level positions for even filtering. The reservoir is ring-shaped in one embodiment and has a central opening with a depending hollow spike for puncturing a rubber stopper of a blood supply bottle containing a medium for agglomerating and sedimenting a red cell portion of blood, which supply bottle fits into the center opening and supports the reservoir. Vacuum applied to the reservoir pulls a supernatant liquid above the red cell layer from the bottle, distributes it to the plural filter disc housings for filtering, and then deposits the filtrate into the reservoir.

BACKGROUND

This invention relates to a filtering unit for collecting bacteria from blood onto filter discs. These filter discs are then placed in contact with a culture growth media for subsequent enumeration and identification of the bacteria. By knowing what bacteria are present in the patient's blood and likely to be causing his illness, a physician can prescribe a particular treatment.

In the past there have been many problems in identifying the particular bacteria in a patient's blood. For many years blood has been cultured as whole blood, with a small 5 ml. quantity of blood diluted 1:10 in a 50 ml. blood culture bottle containing a growth media. The reason for this dilution was to minimize the effects of the blood's natural bacteria inhibitors, such as β-lysin and lysozyme, as well as antibiotics previously administered to the patient. Because such a small sample of blood was used, such organisms as Brucella and Salmonella, present in only small quantities, could escape detection. Another disadvantage of using whole blood for culturing was that the red cells sometimes formed clots that physically blocked the rapid growth of bacteria several days were required for bacteria to multiply sufficiently for identification.

It has been proposed that concentrating organisms from a blood sample onto a small filter could provide a rapid detection of a bacteremia by washing away inhibitors and growth, recovering microorganisms first in the form of characteristic colonies, and reducing opportunity for contamination in processing the blood sample filter. Thereafter, this filter could be placed in direct contact with a growth media such as blood agar where the concentrated bacteria produce identifiable growths much faster than in a broth culture. A physician could usually be informed of the specific bacteria in a patient's blood within 24 hours after the blood sample was taken. The physician could then begin treatment immediately. Two publications that describe the blood cell separation and filtration method are listed below:

(a) Winn, et ad.: Rapid Diagnosis of Bacteremia With Quantitative Differential-Membrane Filtration Culture; JAMA 197:539–548, Aug. 15, 1966.
(b) Kozub et al.: A Practical Culturing Method Employing Dilution and Filtration; The American Journal of Clinical Pathology, 52:105, July 1969.

While these two publications describe a filtering and culturing procedure that was a great improvement over the previous culturing of whole blood and provided faster results, the apparatus was very difficult and complicated to use. This was because the clinical laboratory technician had to set up an elaborate network of flexible plastic tubing for each filtration. Even after the network of tubing was assembled, there was a problem of keeping the filters level for even filtration and avoiding contamination. The filters supported by a flexible tube leading from a suspended supply container would move when this flexible tube moved thereby causing the filters to tilt and filter only along lower edges of the filter. Also the blood supply container suspended high above housing for the filters created a static head pressure which was transmitted to the filter housings through flexible tubing used to suspend these housings. This internal pressure sometimes caused the filter housings to break open, thus ruining the filtration results and the entire procedure had to be repeated. The complexity of the apparatus and its instability made it easy to introduce contaminants and ruin the sample.

In short, the previous apparatus for accomplishing blood filtration for bacteria culture was a burdensome thing to use, gave no adequate support for the filters, and make aseptic technique difficult.

SUMMARY

My invention overcomes the problems of previous blood filtering apparatus by providing a unique compact filtering unit that is easy to handle and has a rigid reservoir chamber with two or more filter housings rigidly secured to a top wall of the reservoir to keep them level. Such a unit, with its plurality of rigidly joined filter housings supported horizontally at the same level, and supplied with liquid transmitted by a single distribution chamber constitutes a highly effective means for performing filtration onto multiple filter members. In one embodiment of the invention, the reservoir is ring-shaped and has a central opening that receives a neck of a blood supply bottle so the bottle can support both the reservoir and filter housings in level positions. A blood sample in first collected in the supply bottle where it is diluted with a nutrient and a red cell settling solution. This causes the supernatant liquid and the red blood cells to segregate into respective upper and lower layers with an interface therebetween. The supernatant liquid includes such components as the leukocytes or white blood cells, bacteria that are in and among these white cells, and other elements of the blood plasma. A vacuum source is then applied to the reservoir which pulls the supernatant liquid out of the bottle through a tube, distributes it to the filter housings, and then deposits the filtrate into the ring-shaped reservoir. Throughout the specification and claims where the term "blood supply" bottle or container has been used to avoid confusion with the reservoir which collects the filtrate, it is understood that in hospitals this bottle is often called a "blood collection" bottle or container because of its use in obtaining a blood sample from a patient.

In a second embodiment, the blood supply container is integral with the ring-shaped reservoir and located in its central opening.

A third embodiment shows the blood supply bottle in a mouth downward position and rigidly mounted on the wardly extending hollow spike rigidly mounted on the rigid reservoir. The blood supply bottle of this last embodiment has a closed end sleeve extending into the bottle to a position slightly above an interface between an upper supernatant layer and a lower red cell layer. The spike on the reservoir punctures an end of this sleeve so the upper white cell layer can flow out of the bottle through the filter housing and into the reservoir without disturbing the lower red cell layer in the blood supply bottle.

The medical liquid filter units of this invention are structurally rigid, easy to use, and do not require extensive networks of flexible tubing to be made before the units will work. A laboratory technician simply plugs the spike of the first embodiment of the ring-shaped reservoir into a bottle of the sedimented red blood cells, connects a vacuum to the rigid reservoir and in a few minutes any bacteria or intraleukocytic organisms are concentrated on filter discs ready for culture and the liquid filtrate is in the reservoir.

Although the filter units are described in terms of filtering bacteria from blood, other substances could be filtered, such as thoracentesis fluid, cerebrospinal fluid, uterine washes, or other fluids for cytological examination, etc.

DETAILED DESCRIPTION

Referring in detail to these drawings, the first embodiment of the invention includes a rigid reservoir 1 with a bottom portion 2 comprising a base wall 3 and two concentric upstanding walls 4 and 5, which walls have concentric groove sections 6 and 7 at their upper ends. Fitting across the upper ends of walls 4 and 5 of the reservoir is a rigid transparent top wall 8 with concentric tongue sections 9, 10 that couple with the groove section 6, 7 to form air-tight joints so the reservoir can be evacuated to suck a filtrate into the hollow reservoir.

Integrally formed with the rigid top wall are two filter cups 11 and 12 having substantially horizontal drain floors 13, 14, respectively, with respective outlets 15, 16 emptying into the reservoir. The drain floors 13, 14, which form an integral section of top wall 8 have a series of grooves 17, 18, respectively, for conducting liquid to their respective outlets. Across the top of each filter cup is a removable cap, one being shown at 19, which forms an air-tight friction fit with its cup to thereby define one of the two filter housings rigidly supported on top wall 8. By maintaining the rigid reservoir 1 in a level position, the rigidly connected filter housings are also kept level for even filtering of liquid through the filter housings.

When filtering bacteria from blood or other medical liquid, a filter disc, such as 20, is placed in each of the two filter cups and the caps are firmly pressed onto the cups to create air-tight joints in the filter housings. Each filter housing has a liquid inlet, 21, 22, above the filter discs for liquid to enter, be filtered through the filter discs, and then deposited into the reservoir. Such inlets communicate directly with distribution chamber 28, as illustrated most clearly in FIGS. 6 and 7. The grooves in the drain floors under the filter discs aid in the liquid flow to the outlets 15, 16, and are preferably between .010 inch (.254 mm.) and .030 inch (.762 mm.) wide so a thin delicate membrane can be supported on the drain floor without materially sagging into the grooves. A filter disc with pores of $.45\mu$ size, having approximately .002 inch (.051 mm.) thickness and 2 inch (5.08 cm.) diameter will span these grooves without substantially sagging into the grooves. Very suitably filter discs of the size and porosity mentioned above are marketed by the Millipore Corporation. While this filter will not substantially sag into the grooves and is suitable for most filtering, a few bacteria grow in such small colonies that even the slightest sag into a groove will cause a shadow to be cast across the colony so as to make identification difficult. An example of such bacteria is Hemophilus influenzae. To further aid in eliminating any sag in the filter disc, a porous paper or woven fabric pad 48 can be placed under each filter disc and on top of the grooved drain floor.

As explained above, the rigid unit illustrated in FIGS. 1–7 has two filter housings, with each having its own separate filter disc. This is important because the two filter housings can receive liquid from a supply source and the liquid divided with approximately equal portions of the liquid simultaneously flowing into each housing from distribution chamber 28. This is because both filter housings are maintained at a common height and in level positions. Thus, there is very little chance that the filtering liquid and bacteria will bunch up along one edge of a filter disc or have nearly all the liquid flow through just one of the filter housings. If this were to happen, the filter disc that was starved of liquid would very likely give an erroneous negative indication of a particular bacteria because there were not a sufficient number of the bacteria deposited for growth and detection. These were real problems for previous types of filtering apparatus that were haphazard arrangements of flexible tubing networks with filter chambers dangling from flexible tubing hung from suspended liquid supply containers.

In applicant's rigid reservoir with two or more rigidly attached filter housings having filter cups integrally formed with a top wall 8 of the reservoir and friction fitted caps, the problems of the previous filtering apparatus are overcome. Within applicant's rigidly supported filter housings, the two filter discs receive a simultaneous and generally uniform distribution of bacteria on their top surfaces. Upon removal of the filter discs from the housings, one disc is tested in an aerobic environment to determine if any oxygen viable bacterial specie are present. The other disc is placed in a Brewer anaerobic jar or other anaerobic environment for detection of bacterial specie viable in an oxygen free environment, such as a nitrogen environment. Previous filtering units that collected bacteria on a single filter disc required the laboratory technician to cut the disc into pieces for two or more tests. This was a tedious procedure and often resulted in the technician contaminating the segments of the filter discs with his hands or his instruments.

Having discussed the importance of proper control of the two filter housings by the rigid reservoir, the reservoir will be explained with particular emphasis on how it can be firmly supported by a unique relationship with a blood supply bottle 23. As mentioned above, the reservoir in the FIGS. 1–7 embodiment is ring-shaped and has a hollow longitudinal central opening 24. This opening can best be seen in FIG. 3 where the opening extends upwardly from the base wall 3 to the top wall 8 of the reservoir. Here the top wall 8 has a rigid supporting section 25 that extends across the central opening. Mounted on the supporting section 25 is a rigid spike 26, with a longitudinal bore and with a lower pointed puncture end 27, which communicates directly with the distribution or manifold chamber 28, formed in the top wall of the reservoir; see FIG. 7. This distribution chamber has side openings 21, 22 (FIGS. 6 and 7) that lead into the filter housings above the filter discs. Thus liquid can flow through the spike, into the distribution chamber 28, into the filter housings where bacterial are collected on the filter discs, and finally the liquid filtrate deposited into the reservoir.

The structure of the spike 26 and supporting section of the top wall just described is used to support the reservoir and filter housings on a top portion of a generally flat bottomed blood supply bottle 23 capable of standing upright on any substantially level surface. By acting as this support, the blood supply bottle is physically held below the filter housings and does not create a static head pressure from above which is transmitted inside the filter housings tending to break them apart as might happen with a bottle suspended above the filter housings.

Figure 1:
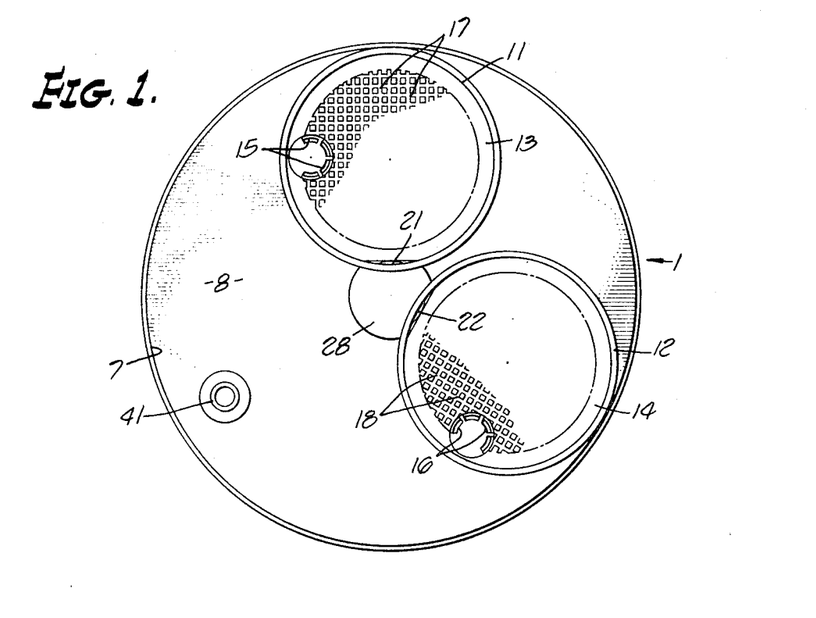
FIG. 1 is a top plan view of the first embodiment of the filter unit with the filter housings shown with their caps removed.
Figure 2:
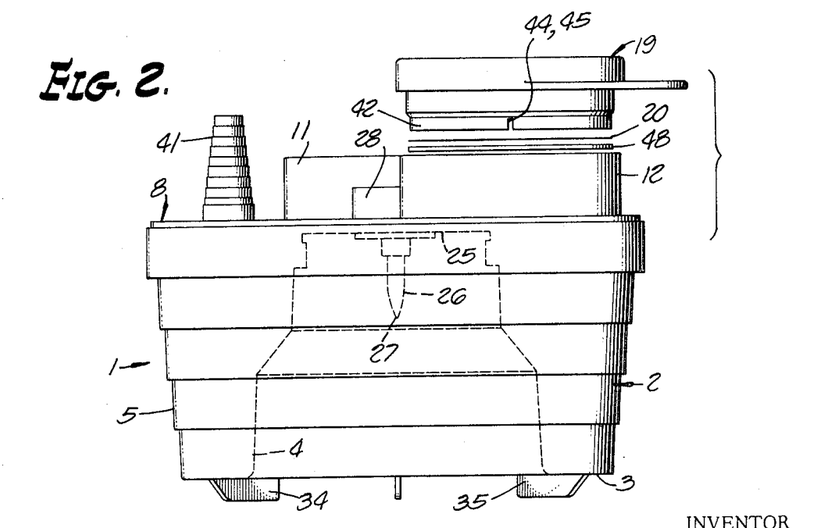
FIG. 2 is an exploded front view of the unit of FIG. 1, with the filter disc and cap of one filter housing shown spaced above a lower cup of the housing.
Figure 3:
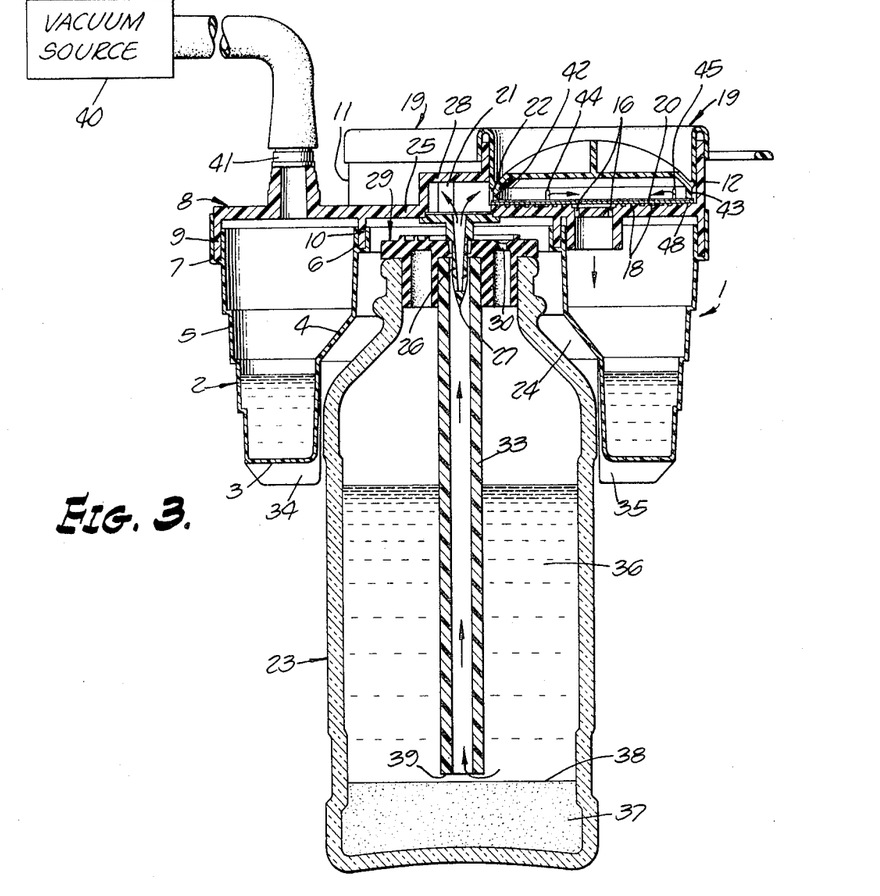
FIG. 3 is a cross sectional view of the filter unit of FIG. 2 showing it mounted on the neck of a blood supply bottle and connected to a vacuum source.
Figure 4:
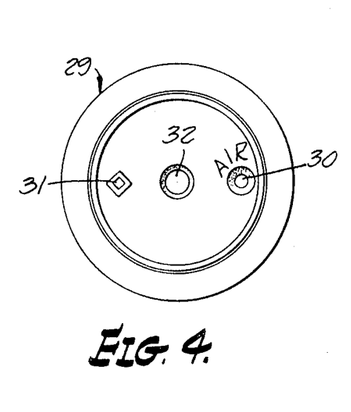
FIG. 4 is a top plan view of the bottle stopper of FIG. 3.
Figure 5:
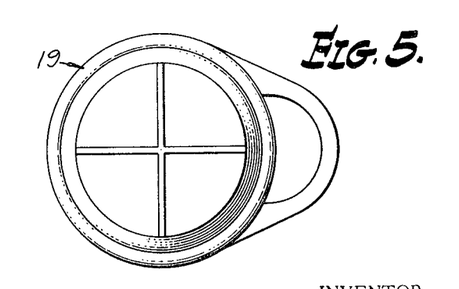
FIG. 5 is a top plan view of a cap for each filter housing.

In FIG. 3, the blood supply bottle has a rubber stopper closure 29 in a mouth of the bottle. This stopper has an air inlet 30, a puncturable injection site 31 and a centrally located liquid outlet port closed by a pierceable diaphragm 32. Directly below the pierceable diaphragm is a tube 33 attached to the stopper and extending a substantial distance down into the bottle. When the neck portion of the blood supply bottle is pushed into the central opening of the reservoir, the pointed lower end of the spike aligns with the puncturable diaphragm 32. Downward pressure on the reservoir pushes the spike into tube 33 with a flange of the spike coming to rest on the rubber stopper. Because the reservoir 1 is ring-shaped and fits around the bottle as in FIG. 3, the bottle sitting on a level laboratory table can keep the reservoir and filter housings level for even filtering. A series of ribs 34, 35 attached to the inner wall 4 help rigidify the reservoir and can engage the bottle to prevent excessive tilting of the reservoir. The ribs have feet which extend below the reservoir's base wall 3 for supporting the reservoir on a level table when not connected to the blood supply bottle 23. The feet also maintain the base wall 3 above a top surface of such table so a flexible tube can fit between the feet. This flexible tube can be used to connect spike 26 to a blood supply bottle sitting beside the reservoir if desired. However, it is preferred to have the blood supply bottle fitting within the reservoir's central opening where it can support the reservoir.

The supporting bottle of FIG. 3 is shown ready for filtering. The blood supply has been previously prepared by injecting 5–15 cc. of whole blood into a bottle which contains 200 ml. of 5% glucose solution for settling the red cells and a buffered nutrient for the bacteria. The diluted blood sample is maintained at a pH of 6.4 to 6.6 for approximately 2 hours or until an interface 38 is formed between the upper supernatant layer 36 and a lower red cell layer 37. The inlet port at lower end 39 of the tube connected to the bottle stopper is positioned slightly above this interface.

With the reservoir 1 and bottle 23 connected as in FIG. 3, it is very easy to filter the supernatant layer 36 through the filter discs without getting a substantial accumulation of red cells in the filter housings which might clog the filters and prevent rapid growth of bacteria. A vacuum source 40 is connected to an upstanding connector 41 on the top wall of the rigid reservoir, the reservoir in turn being supported by bottle 23. This vacuum pulls supernatant layer 36 up through tube 33, into the distribution chamber 28, through side openings 21, 22, onto the filter discs, and then deposits the filtrate into the reservoir as shown by the arrows. For this vacuum system to work, all joints between the reservoir's bottom portion, top wall, filter cups, and filter caps must be air-tight. I have found that the tongue and groove joints of FIG. 3 do make such air-tight seals with simple friction fits. No adhesive is required.

Figure 6:
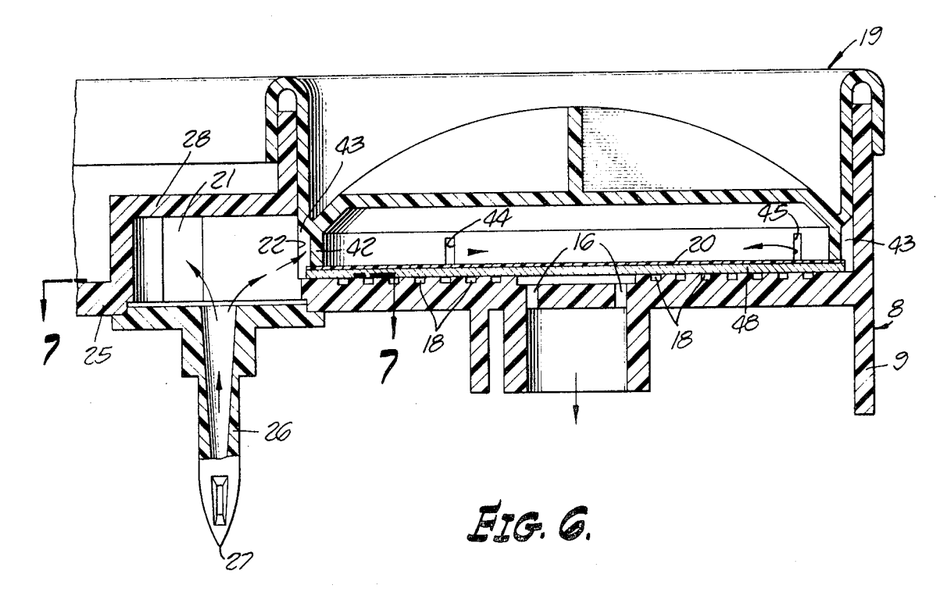
FIG. 6 is an enlarged cross sectional view showing a portion of FIG. 3 in more detail to illustrate the path liquid takes in its travel from the blood supply bottle to the reservoir.
Figure 7:
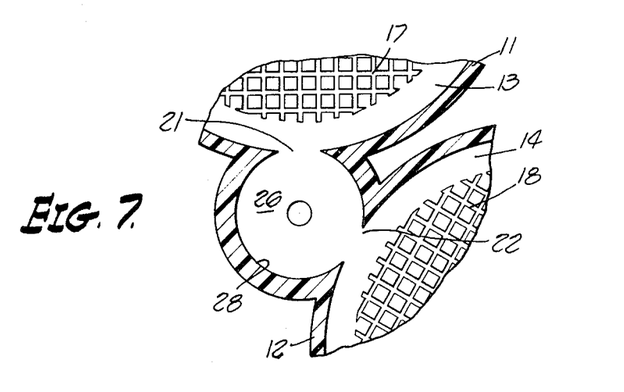
FIG. 7 is a cross sectional view taken along line 7—7 of FIG. 6 showing the two openings into the filter housings.

As the vacuum pulls the supernatant layer onto the filter discs, as best seen in FIG. 6, the closure cap 19 has an inner hoop section 42 that holds the filter disc 20 down against the drain floor or against a supporting under pad if used. The hoop section 42 has an outer wall that is spaced inwardly a small distance from the inner wall of the filter cup's upstanding wall, and this combined structure defines an annular passage 43 around the lower portion of the cap. As illustrated by the arrows, the liquid entering the filter housing does not spill out directly onto the filter disc from a single inlet opening. Instead, the liquid moves along passage 43 around the bottom portion of the cap and flows onto the filter disc from several gates, such as 44, 45. This helps to avoid bunching or concentrating of bacteria or intraleukocytic organisms at a particular location on the filter disc and thereby facilitates individual colony growth.

Figure 8:
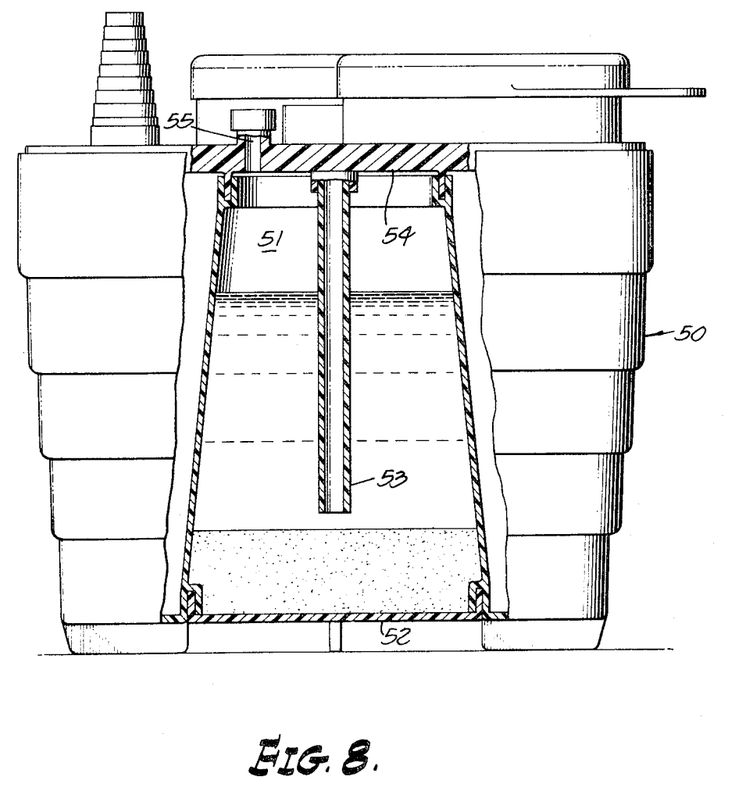
FIG. 8 is a front elevational view, partially cut away, of a second embodiment of the filter unit where the blood supply container is integral with the rigid reservoir.

Having discussed the first embodiment of the invention, FIGS. 1–7 in detail, we move on to the second embodiment in FIG. 8. This second embodiment has a ring-shaped reservoir 50 and filter housings similar to the FIGS. 1–7 version. However, here, the central opening 51 in the reservoir has a bottom wall 52 that is secured to the reservoir's inner upstanding wall. There is a tube 53 connected to a supporting section 54 of the top wall extending across the central opening. This modified central opening forms the blood supply container itself and no separate glass bottle is required. A sample of blood is inserted into a bacteria nutrient and red cell settling solution through an inlet port 55 on the reservoir's top wall. This inlet port could include a puncturable resealable diaphragm, a screw cap or other type closure. The manner in which the upper supernatant layer is drawn simultaneously into the filter chambers through a central distribution chamber is the same as the first embodiment.

Figure 9:
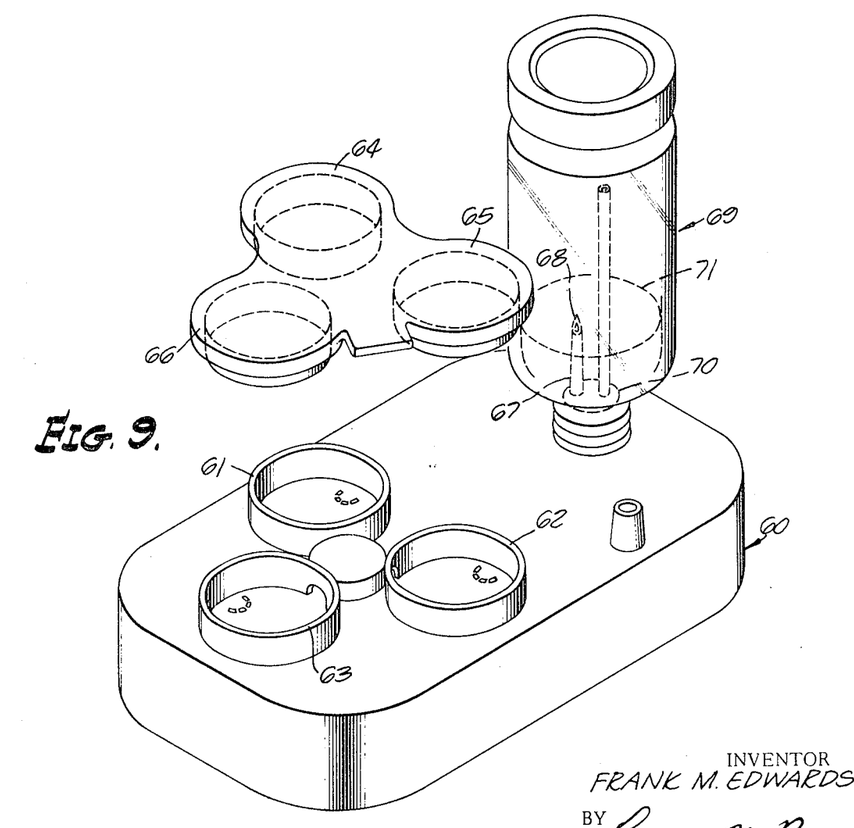
FIG. 9 is a perspective view of a third embodiment where the rigid upstanding hollow spike connects with a mouth downward blood supply bottle.
Figure 10:
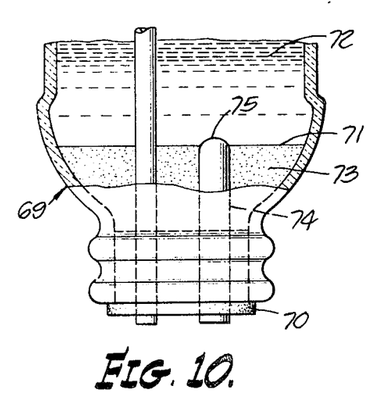
FIG. 10 is an enlarged view of the mouth and closure section of the blood supply bottle of FIG. 9, showing a sleeve structure in the bottle before it is punctured by a reservoir spike.
Figure 11:
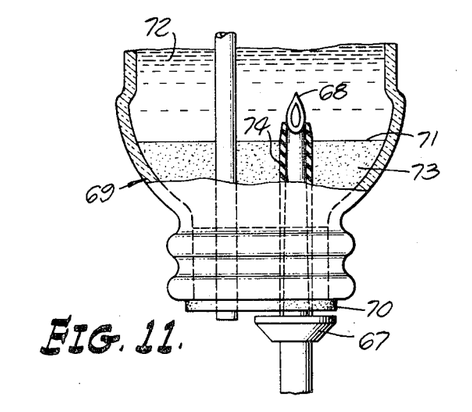
FIG. 11 is a view similar to FIG. 10, but showing the sleeve structure after it has been punctured by the spike of FIG. 9.

In FIGS. 9–11, there is a third embodiment of the invention. In these figures, a rigid hollow reservoir 60 has three filler cups 61, 62 and 63, and these cups have three caps 64, 65 and 66, which are secured together for easy assembly to the cups. This version of the invention also shows that more than two filter housings can be used to provide several individual bacterial carrying filter discs for additional laboratory tests.

The reservoir 60 of FIG. 9 has a hollow rigid spike 67 rigidly mounted on its top wall and this spike extends upwardly to a sharpened puncture end 68. In this filtering unit, the blood supply bottle 69 is in a mouth downward position with the spike 67 extending upwardly through a rubber stopper 70 of the bottle to a point slightly above an interface 71 between the supernatant layer 72 and the red blood cell layer 73.

FIG. 10 shows an enlarged view of the blood supply bottle 69 immediately before it is connected to the spike. The botttle has a sleeve 74 connected to the bottle stopper and this sleeve extends upwardly into the bottle slightly past the interface 71 and has a closed upper end 75 in FIG. 10. In FIG. 11 when the spike enters the sleeve as the bottle is connected to the spike, the spike's pointed upper end punctures the closed end 75. Thereafter, the spike can drain the upper supernatant liquid layer 72 without stirring up and disturbing the lower red cell liquid layer 73. Without the sleeve 74 the spike might agitate and stir up the red cell layer making the interface less distinct and cause red cells to mix with the upper supernatant layer 72 and be drawn into the filter housings.

After the spike punctures the sleeve 74, and the supernatant layer flows into the reservoir through the manifold chamber and the filter housings, air can flow into the bottle 69 to replace the exiting liquid.

When the level of liquid in the blood supply bottle 69 reaches the level of the spike opening, the system will begin to draw air in through the filter chambers. This helps dry out the filter discs and is a distinct advantage. Bacteria are more likely to remain on a dry filter disc during removal of the disc from the filter housing than on a wet dripping filter disc that is picked up with tweezers and often tilted into a vertical plane. This filter disc air drying feature is present in all embodiments of the filter unit. Air that is drawn into the bottle through the stopper to replace the supernatant liquid and dry the filter discs can be pre-filtered for airborne bacteria by placing a cotton plug in air inlet 30 of the stopper.

In the three embodiments of my invention, the filtering units are extremely easy to use. Taking for example the first embodiment, a clinical laboratory technician injects blood into the bottle through the injection site in the rubber stopper. The bottle already has the bacteria nutrient and red cell settling solution in it. After the red cells settle, he simply plugs the spike into the stopper of the bottle, connects a vacuum hose, and in a matter of a few minutes, the supernatant layer will be filtered. One can observe the filtrate flowing into the reservoir through its transparent top 8. When filtration is finished, air is pulled through the filter discs to dry them. This will be accompanied by a slurping sound indicating that the supernatant layer has been filtered and drying of the filter discs is occurring. At this point a second bottle filled with a wash solution, such as saline at physiological concentration (.85%), can be exchanged for the blood supply bottle if desired and the filter discs flushed to help clean debris from the bacteria that might inhibit their growth. After the filter discs are dried, the caps are removed and the filter discs lifted out of their respective cups for culturing often by being placed in direct contact with a growth media such as blood agar in a Petri dish.

The entire procedure from injecting blood into the blood supply bottle to removal of the filter discs explained above is carried out in a closed system that includes the components of the supply bottle, filter housings, filter discs, and reservoir, all of which can be supplied in a sterile condition to a hospital or clinical laboratory ready to use.

This closed system compact filtration unit has been described in the specification as particularly useful for filtering the supernatant liquid from a blood solution after the red cells have settled to the bottom of the blood supply bottle. The convenient filtration unit can also be readily adapted for filtering the entire contents of the blood supply including the red blood cells by extending tube 33 to the bottom of bottle 23. When all components of the blood supply bottle are to be filtered, the red blood cell walls are broken by a lysing solution placed in bottle 23 so that the red cells will not clog the filter. Preferably, the lysis of the red blood cells takes place without materially destroying the bacteria in and among the red blood cells.

The filter unit containing the filtrate is preferably discarded after a single filtering use to reduce the chance of contamination in the laboratory. I have found that the units can be made very economically when injection molded of thermoplastic materials—the reservoir top of styrene-acrylonitrile (SAN), the spike also of SAN, and the bottom of the reservoir and the caps of polypropylene.

It will be observed that in each form of the invention, some means are provided for maintaining the multiple filter discs in stationary horizontal condition, and at substantially the same level, during a filtering operation. In the embodiments of FIG. 8 and of FIGS. 9–11, such means include the planar bottom surfaces of the reservoirs which extend along planes parallel with the discs, and which make direct contact with suitable supporting surfaces such as, for example, the top surfaces of tables, stands, counters and the like. In the embodiments of FIGS. 1–7, such means include bottle 23 interposed between the reservoir and the supporting surface, and the means for securely connecting the reservoir to such bottle.

In the foregoing description of my invention, I have used specific examples to explain the invention. However, it is understood that persons skilled in the art make certain modifications to these examples without departing from the spirit and scope of the invention.

I claim:

1. A medical liquid filtering unit comprising: a hollow rigid supporting reservoir; a plurality of filter cups rigidly mounted upon the reservoir so that the positions of said cups are accurately controlled by controlling the position of the reservoir; said cups having rigid upstanding peripheral walls; defining means adapted to receive and segregate respective filter members; a separately removable closure fitting over and closing each respective cup and defining in combination with such cup a filter housing; individual filters disposed in the respective housings and independently removable therefrom, whereby, liquid passing through the filtering unit is caught in the reservoir and each filter can be removed from its housing without contaminating another filter; said filter housings having outlets into the reservoir and inlets for connecting to a medical liquid source, which unit can receive liquid from the source and cause it to flow through the filter housings mounted on the reservoir and then into the reservoir to segregate and collect independent uncontaminated individual uniform filter specimens from the medical liquid.

2. The combination as set forth in claim 1, wherein the supporting reservoir has a rigid top wall and the filter cups are integrally formed with the top wall.

3. The combination as set forth in claim 2, wherein a portion of the reservoir's top walls provide drain floors in the filter cups, which drain floors have outlet openings through them into the reservoir and a series of drain channels for flow to the outlet openings when filter members are supported on the drain floors.

4. The combination as set forth in claim 1, wherein there is a hollow spike rigidly mounted on the reservoir for connecting with a medical liquid supply container.

5. The combination as set forth in claim 4, wherein this spike extends upwardly from the reservoir to a top puncture end.

6. The combination as set forth in claim 5, wherein the combination includes a mouth downward bottle with a closure across its mouth which fits around the upstanding spike, said bottle containing upper and lower layers of a medical liquid with an interface therebetween, and said spike extends upwardly through the lower layer and has an opening slightly above the interface, whereby the upper layer can be removed through the spike without disturbing the lower layer.

7. The combination as set forth in claim 6, wherein the bottle has a closed sleeve extending inwardly from its stopper into which the spike fits, said spike causing the sleeve to open at a location slightly above the interface in the mouth downward bottle.

8. The combination as set forth in claim 7, wherein the spike has a pointed upper end and the sleeve has a closed upper end that is punctured by the spike when inserted into the sleeve.

9. The structure as claimed in claim 3 in which said drain channels are from .010 inch (.254 mm.) and .030 inch (.762 mm.) wide, said filters comprising a thin delicate membrane supportable on the drain floors without appreciable sagging for obviating shadows in bacteria colonies on the filters.

10. The structure as claimed in claim 1 in which said closures include a lower flange spaced inwardly from the peripheral wall and defining chambers surrounding the cups, said lower flanges having the inlets incorporated therein for distributing the medical liquid uniformly into the cups onto said filter members.

11. The structure as claimed in claim 10 in which said reservoir includes a manifold for connection with the medical liquid source, said manifold communicating with each of said surrounding chambers.

12. The combination as set forth in claim 1, wherein the reservoir is ring-shaped and is adapted to fit around and be supported by a bottle which provides a medical liquid supply source.

13. The combination as set forth in claim 12 wherein the ring-shaped reservoir has a central longitudinal opening, a support member joined to the reservoir which extends into this opening, and a coupler mounted on this support member for connecting with a liquid supply bottle.

14. The combination as set forth in claim 13, wherein the coupler is a rigid hollow spike with a pointed lower puncture end.

15. A medical liquid filtering unit comprising: a hollow rigid ring-shaped reservoir, said reservoir having a central cavity portion defining a low center of gravity and being adapted to fit around and be supported by a liquid supply bottle; the reservoir including a lower support portion for resting on a support surface in a stable condition; at least one filter housing connected to the reservoir and having an outlet open in the reservoir and having an inlet opening; and a coupler which is in flow of communication with the filter housing's inlet for connection with a liquid supply bottle when such bottle is supporting the ring-shaped reservoir or for connection to a source of medical liquid when the reservoir is resting on a support surface.

16. A medical liquid filtering unit comprising: a hollow rigid ring-shaped reservoir with a central opening therein; at least one filter housing connected to the reservoir and having an outlet opening into the reservoir and having an inlet opening; a liquid supply container disposed within the central opening of the ring-shaped reservoir; and a distribution chamber communicating with both said liquid supply container and the filter housing.

17. The combination as set forth in claim 16 wherein there is a plurality of said filter housings, said distribution chamber communicating with all of said housings for distributing liquid simultaneously thereto.

18. The combination as set forth in claim 17 wherein said plurality of filter housings contain substantially horizontal filter members, the filter members of the respective housings being disposed at substantially the same elevation.

19. The combination as set forth in claim 16, wherein the supply container is integrally joined to the ring-shaped reservoir.

20. The combination as set forth in claim 16, wherein the supply container has a bottom wall, and there is a tube in flow communication with said distribution chamber, which tube extends a substantial distance down into the container but has an inlet opening above the container's bottom wall.

21. The combination as set forth in claim 20, wherein the supply container contains blood that is layered into upper and lower portions with an interface therebetween, and the tube has its lower opening slightly above this interface.

22. The combination as set forth in claim 16, wherein the liquid supply container is a separate rigid bottle at least a portion of which is adapted to fit into the center opening of the ring-shaped reservoir, and a coupler is secured to said reservoir and detachably connected to said bottle, said coupler communicable with said distribution chamber and said bottle.

23. The combination as set forth in claim 22, wherein the coupler is a rigid hollow spike mounted on the reservoir; said bottle having a mouth; and a closure fitting across this bottle mouth and having a diaphragm which is puncturable by the spike upon insertion of the bottle into the center opening of the ring-shaped reservoir.

24. The combination as set forth in claim 23, wherein the bottle has a bottom wall, and there is a tube attached to the closure so as to be in flow communication with the spike when the diaphragm is punctured, said tube extending a substantial distance down into the bottle and having an inlet opening above the bottle's bottom wall.

25. The combination as set forth in claim 22, wherein said bottle extends downwardly beneath the bottom of said reservoir, said bottle leaving a bottom surface adapted to rest upon a flat support surface for maintaining said unit stationary during a filtering operation.

26. A medical liquid filtering unit comprising: a hollow rigid reservoir; a filter housing connected to the reservoir and having an outlet into the reservoir and having an inlet opening; a liquid supply container containing a liquid defining an upper surface within the liquid supply container and having an outlet in flow communication with the filter housing's inlet opening, said liquid supply container physically supporting the reservoir in a position such that the filter housing on the reservoir is above the upper surface of the liquid in the liquid supply container so as to avoid development of a static liquid head pressure inside the filter housing which would tend to break open the filter housing.

27. The combination as set forth in claim 26, wherein the filter housing includes a cup and a closure held together by a friction fit.

28. A medical liquid filtering unit comprising: a hollow rigid ring-shaped reservoir with a central opening therein; a rigid top wall connected to the reservoir and having a wall portion extending across the reservoir's central opening; at least two filter cups integrally formed with the reservoir top wall and having outlet opening through the top wall into the reservoir's interior; a filter member in each filter cup; a removable cap friction fitted to each filter cup to define filter housings; with each filter housing having an inlet opening above its filter member; a rigid puncture spike, having a bore therethrough and mounted on the wall portion that extends across the reservoir's central opening; said unit having a distribution chamber communicating with said bore and each of the inlets of the filter housings; a rigid bottle having a bottom wall and a mouth at its top, said bottom wall having an undersurface adapted to rest with stability upon a flat supporting surface, said bottle containing a medical liquid separated into a light upper layer and a heavy lower layer with an interface therebetween; a closure across the bottle mouth and having a puncturable diaphragm alignable with the puncture spike when the top portion of the bottle is inserted into the reservoir's central opening; a tube connected to the bottle's closure and adapted to join in flow communication with the spike upon puncture of the diaphragm, said tube having an inlet opening slightly above the interface between the upper and lower liquid layers in the bottle; a hollow connector on the reservoir; and a vacuum source attached to this connector, whereby a vacuum created in the reservoir will pull the lighter liquid layer from the bottle up through the tube, distribute it over both filters, and then deposit the filtrate into the reservoir.

29. The combination as set forth in claim 25, wherein said bottle projects downwardly a substantial distance below said reservoir.

30. The combination as set forth in claim 28, wherein each of said filter members is substantially horizontally disposed.

31. The combination as set forth in claim 30, wherein said filter members are all disposed at substantially the same elevation.

32. The combination as set forth in claim 28, wherein the ring-shaped reservoir includes a bottom portion with two concentric walls, said walls having top ends that join to the top wall at two concentric tongue and groove structures to form air tight joints in the rigid reservoir capable of holding a vacuum.

33. The combination as set forth in claim 28, wherein each cup and cap fit together to define structural means for receiving liquid from said distribution chamber and causing it to flow onto the filter discs through a series of gates for even distribution.

34. The combination as set forth in claim 28, wherein the rigid reservoir, filter cups, and caps are of thermoplastic material.

35. The combination as set forth in claim 28, wherein at least a portion of the rigid reservoir is transparent so that flow and volume of liquid entering the reservoir can be observed.

36. The combination as set forth in claim 35, wherein the reservoir's top wall is transparent.

References Cited

UNITED STATES PATENTS

| | | | |
|---|---|---|---|
| 2,718,310 | 9/1955 | Traham | 210—406 |
| 2,879,207 | 3/1959 | Poitras | 195—103.5 R X |
| 2,896,787 | 7/1959 | Roman | 210—406 |
| 2,923,669 | 2/1960 | Poitras | 195—103.5 R |

HOUSTON S. BELL, Jr., Primary Examiner

F. R. SCHMIDT, Assistant Examiner

U.S. Cl. X.R.

141—59, 330, 286, 380; 210—345, 406